United States Patent Office 3,397,054
Patented Aug. 13, 1968

3,397,054
PROCESS FOR CONTROLLING PLANT GROWTH
Richard D. Hart, Ambler, Pa., and Howard E. Harris, Bloomfield, N.J., assignors to Schering Corporation, Bloomfield, N.J., a corporation of New Jersey
No Drawing. Continuation-in-part of applications Ser. No. 220,555, Aug. 30, 1962, and Ser. No. 323,577, Nov. 14, 1963. This application Feb. 16, 1966, Ser. No. 527,732
10 Claims. (Cl. 71—105)

This application is a continuation-in-part application of our co-pending applications Ser. No. 220,555, filed Aug. 30, 1962, and Ser. No. 323,577, filed Nov. 14, 1963, both now abandoned.

This invention relates to processes classified in the art of killing noxious vegetation and, more particularly, to processes of selectively controlling such vegetation.

The invention resides in the concept of a process which comprises substantially uniformly distributing in an area infested with weeds or weed seeds a formulated composition including a chemical compound having a molecular structure in which the 4-hydroxybenzonitrile nucleus has attached thereto in the 3-position a halogen atom.

The invention is based upon the discovery that the 3-halo-4-hydroxybenzonitriles, or their formulated modified-hydroxy equivalents, have been found to exhibit a surprisingly high degree of post-emergent herbicidal activity and are selective in their action against undesirable vegetation in commercial crops. Also, the 3-halo-4-hydroxybenzonitriles exhibit some pre-emergent activity.

It has been further found that the addition of another halogen atom at the 5-position of the 3-halo substituted 4-hydroxybenzonitrile nucleus, or its formulated modified-hydroxy equivalents, greatly improves the post-emergent herbicidal characteristics of the 3-halo-4-hydroxybenzonitriles. It has also been found that the addition of a lower-alkyl substituent at the 5-position of the 3-halo-substituted 4-hydroxybenzonitrile nucleus, or its formulated modified-hydroxy equivalents, also contributes desirably to the pre-emergent aspect of the 3-halo-4-hydroxybenzonitriles. The addition of another lower-alkyl substituent at the 2- or the 6-positions of the foregoing halogenated 4-hydroxybenzonitriles likewise affords compounds having some pre- and post-emergent herbicidal activity.

As used herein, the term "formulated modified-hydroxy equivalents" means derivatives of the 4-hydroxybenzonitriles, such as their salts, alkanoyl esters, alkyl ethers, and the like, which are known and commonly used expedients in preparing agricultural formulations and which do not create any difference in kind of herbicidal activity from that shown by the free hydroxybenzonitriles. These hydroxy equivalents do not change the characteristic utility properites of the free hydroxybenzonitriles, but merely facilitate application or formulation of the compounds as useful herbicides by increasing their solubility in vehicles such as oil, water or oil-water emulsions and the like. The hydroxy equivalents provide for greater elegance in formulation by allowing for greater dispersibility, contact adherence, spreadability, resistance to weathering, and the like, in the known manner.

The tangible embodiments of the compounds used in the composition aspect process of this invention possess the inherent general physical properties of being crystalline solids, substantially insoluble in water, soluble in aqueous alkali from which solutions the alkali metal salts may be obtained on evaporation of water, and are soluble in polar solvents. Examination of compounds produced according to the hereinafter described processes reveals, upon ultraviolet and infra-red spectrographic analysis, spectral data confirming the molecular structure herein set forth. For example, the frequency characteristic of the nitrile and of the hydroxyl functions, taken together with the nature of the starting materials and the mode of synthesis, positively conform the structure of the compounds sought to be patented.

In order to illustrate the unexpected properties of high herbicidal activity and selectivity of the compounds of the present invention there are presented below a series of tables, wherein the various compounds from the class hereinabove described were applied to stands of growing crops and/or weeds. Included within these tables are results obtained with a well-known herbicidal halo-substituted benzonitrile in order to compare the surprising selectivity as well as activity of the present compounds on a post-emergence basis. These results are presented herewith solely for the purpose of illustrating the outstanding herbicidal activity associated with the compounds of the present invention, and they are not to be construed as in any way limiting the disclosure contained herein.

3,5-diiodo-4-hydroxybenzonitrile and 3,5-dibromo-4-hydroxybenzonitrile were applied, in the form of an amine salt, said amine being a branched-chain primary amine having about twelve to fourteen carbon atoms, to stands of growing weeds at rates of 4 to 8 lbs. of active ingredient per acre. Ten days following application the sprayed plots were inspected and the results are shown below in Table I wherein the herbicidal effectiveness is rated on a 0 to 10 scale, wherein 0 signifies no control, 5 is 50% control and 10 signifies complete kill or 100% control. In the table, Compound A signifies the amount of 3,5-diiodo-4-hydroxybenzonitrile and Compound B identifies the amount of 3,5-dibromo-4-hydroxybenzonitrile actually applied to the growing weeds.

TABLE I

| Compound | A | | B | |
|---|---|---|---|---|
| Lbs./acre | 4 | 8 | 4 | 8 |
| Weed Species: | | | | |
| Yellow Rocket | 10 | 10 | 10 | 10 |
| Chickweed | 10 | 10 | 10 | 10 |
| Velvet Leaf | 10 | 10 | 10 | 10 |
| Lambsquarter | 10 | 10 | 10 | 10 |
| Curled Dock | 10 | 10 | 10 | 10 |
| Cheat Grass | 10 | 10 | 10 | 10 |
| Crabgrass | 10 | 10 | 10 | 10 |
| Barnyard Grass | 9 | 9 | 9 | 9 |
| Wild Oats | 8 | 9 | 4 | 7 |
| Ryegrass | 10 | 10 | | |

The high degree of effectiveness of the diiodo and dibromo-4-hydroxybenzonitriles of this invention is apparent from the above data wherein it will be observed that both mono and dicotyledonous plants are controlled. Close examination of several plant species treated with the dibromo compound revealed the presence of chlorosis in certain of the plants.

In order to compare the herbicidal activity of several of the compounds of this invention with a prior art dihalogenated benzonitrile, there is presented below in Table II a résumé of results obtained ten days after spraying the benzonitriles identified below on stands of mixed mono- and dicotyledonous plants at rates of 2 lbs. of active ingredient per acre.

C—2,6-dichlorobenzonitrile
D—3,5-diiodo-4-hydroxybenzonitrile acetate
E—3,5-diiodo-4-hydroxybenzonitrile

TABLE II

| Compound, at 2 lbs./acre | C | D | E |
|---|---|---|---|
| Plant Species: | | | |
| Curled Dock | 0 | 10 | 10 |
| Lambsquarter | 0 | 10 | 10 |
| Velvet Leaf | 0 | 10 | 10 |
| Chickweed | 0 | 10 | 10 |
| Yellow Rocket | 0 | 10 | 10 |
| Barnyard Grass | 0 | 8 | 8 |
| Ryegrass | 0 | 10 | 10 |

The activity ratings are reported on a 0 to 10 scale as utilized in Table I.

These results clearly demonstrate the surprising and unexpected high activity rates for the compounds of this invention in comparison with the heretofore known dihalogenated benzonitrile.

Tables III to V, below, demonstrate the unusually high degree of herbicidal selectivity, in favor of economic crops, possessed by compounds of the present invention. The results were recorded 10 days after spraying stands of the crop and weeds, and the activity ratings were made on a 0 to 10 scale such as described in relation to Table I above.

TABLE III

| | 3-chloro-4-hydroxybenzonitrile, lbs./acre | |
|---|---|---|
| | 2 | 4 |
| Plant Species: | | |
| Corn | 0 | 1 |
| Alfalfa | 1 | 1 |
| Crabgrass | 9 | 10 |
| Yellow Rocket | 10 | 10 |
| Lambsquarter | 8 | 10 |
| Velvet Leaf | 10 | 10 |

TABLE IV

| | 3,5-dibromo-4-hydroxybenzonitrile, lbs./acre | | |
|---|---|---|---|
| | 2 | 4 | 8 |
| Plant Species: | | | |
| Corn | 1 | 1 | |
| Alfalfa | 1 | 1 | 1 |
| Barnyard Grass | 8 | 8 | 9 |
| Yellow Rocket | 10 | 10 | 10 |
| Chickweed | 10 | 10 | 10 |
| Velvet Leaf | 10 | 10 | 10 |
| Lambsquarter | 10 | 10 | 10 |
| Curled Dock | 10 | 10 | 10 |

TABLE V

| | 3,5-dichloro-4-hydroxybenzonitrile, lbs./acre | |
|---|---|---|
| | 2 | 4 |
| Plant Species: | | |
| Alfalfa | 1 | 2 |
| Corn | 1 | 2 |
| Curled Dock | 10 | 10 |
| Lambsquarter | 10 | 10 |
| Velvet Leaf | 10 | 10 |
| Chickweed | 10 | 10 |
| Yellow Rocket | 10 | 10 |
| Crabgrass | 10 | 10 |

Plantings of two week old corn, highly infested with both broad and narrow leaf weeds, were sprayed at 2 and 4 lbs./acre rates of 3,5-diiodo-4-hydroxybenzonitrile acetate, and 10 days after spraying the plots were inspected and resulted in the following observations, recorded on a 0 to 10 scale as noted hereinabove:

TABLE VI

| | Percent Control | |
|---|---|---|
| | 2 lbs. rate | 4 lbs. rate |
| Plant Species: | | |
| Corn | 1 | 1 |
| Barnyard Grass | 8 | 9 |
| Ryegrass | 8 | 9 |
| Yellow Rocket | 10 | 10 |
| Chickweed | 10 | 10 |
| Lambsquarter | 10 | 10 |
| Velvet Leaf | 10 | 10 |
| Curled Dock | 10 | 10 |

Plantings of two week old wheat, infested with rye and barnyard grasses and with curled dock and with velvet leaf weeds were sprayed at ½, 1 and 2 lbs./acre rates with 3,5-diiodo-4-hydroxybenzonitrile, and 20 days after treatment the plots were inspected with the following observations being recorded on a 0 to 10 scale noted hereinabove:

TABLE VII

| | Rate, Lbs./acre | | |
|---|---|---|---|
| | ½ | 1 | 2 |
| Species: | | | |
| Wheat | 0 | 1 | 2 |
| Ryegrass | 9 | 9 | 10 |
| Barnyard Grass | 9 | 9 | 9 |
| Curled Dock | 10 | 10 | 10 |
| Velvet Leaf | 9 | 10 | 10 |

A field of growing oats, highly infested with fiddle neck, knotweed and shephards purse, was sprayed with 3,5-diiodo-4-hydroxybenzonitrile at rates of ¼, 1 and 3 lbs. active ingredient per acre. One month after spray applications, the treated field plots were inspected and the results were recorded using a 0 to 10 scale as reported hereinabove.

TABLE VIII

| | Rate, Lbs./acre | | |
|---|---|---|---|
| | ¼ | 1 | 3 |
| Species: | | | |
| Oats | 0 | 0 | 0 |
| Fiddle Neck | 10 | 10 | 10 |
| Knotweed | 10 | 10 | 10 |
| Shephards Purse | 10 | 10 | 10 |

To illustrate the effectiveness of adding an alkyl substituent: 3 - t - butyl - 5 - iodo-4-hydroxybenzonitrile was applied to soil which had been seeded with common weed species representative of grasses and broad leaf types. The spraying was conducted immediately after planting of the weed seeds so that no vegetative growth was present on the treated parts of application of the chemical. Three weeks following spray application the plots were inspected and the results are shown in Table IX.

TABLE IX

| Plant: | 16 lbs./acre |
|---|---|
| Alfalfa | 10 |
| Corn | 2 |
| Wild oats | 3 |
| Cheat grass | 10 |
| Foxtail | 9 |
| Barnyard | 5 |
| Crabgrass | 10 |
| Nutgrass | 2 |
| Johnson grass | 4 |
| Curled dock | 10 |
| Snapbeans | 2 |
| Yellow rocket | 10 |
| Chickweed | 10 |
| Soybeans | 3 |
| Pigweed | 10 |
| Velvet leaf | 10 |
| Lambsquarter | 10 |
| Marigold | 10 |

3 - t - butyl - 5 - iodo-4-hydroxybenzonitrile was applied to stands of growing weeds at a rate of 8 lbs. of active ingredient per acre. Ten days following application the sprayed plots were inspected and the results are shown in Table X.

TABLE X

| Plant: | 8 lbs./acre |
|---|---|
| Alfalfa | 10 |
| Corn | 3 |
| Wild oats | 10 |
| Cheat grass | 10 |
| Foxtail | 10 |
| Barnyard | 9 |
| Crabgrass | 9 |
| Nutgrass | 10 |
| Johnson grass | 10 |
| Curled dock | 10 |
| Snapbeans | 10 |
| Yellow rocket | 3 |
| Chickweed | 10 |
| Soybeans | 10 |

TABLE X—Continued

| Plant: | 8 lbs./acre |
|---|---|
| Pigweed | 9 |
| Velvet leaf | 10 |
| Lambsquarter | 10 |
| Marigold | 10 |

The results recorded in Tables III to X inclusive, show from 80 to 100% control over both broad and narrow leaf plants growing among economic crops with no injury to only very slight injury to the desirable plant species.

It is also apparent from the foregoing data that the 3,5-diiodo-4-hydroxybenzonitrile possesses somewhat greater activity than the corresponding dichloro or dibromo analogs. This latter observation was particularly surprising in view of the generally well recognized herbicidal superiority of chloro-substituted analogs over either the bromo or iodo analogs in the analogs in the phenoxy alkanoic as well as the benzoic acid series.

Observations of the effects of the compounds of this invention on plant species showed a behavior suggestive of contact type herbicidal action for several members of this series, while other compounds from this class appeared to impart a systemic type action. Whatever the action, however, it is clear from the results reported above that an exceptionally high rate of herbicidal action is obtained, while at the same time, a surprisingly selective action is obtained in favor of economic crops.

The methods of application reported in the foregoing tables are not intended to be construed as necessarily limiting the scope of this invention. Moreover, while the results reported above show exceptional activity and selectivity on a post-emergence basis, the compounds of this invention may also be applied pre-emergence where certain heribicidal effects are desired on specific plant species. It is well recognized in the art that varying amounts of a herbicidal agent will be employed depending, among other variables, upon the soil or plant type involved, the method of application, climatic conditions, the state of growth of the crops or weeds.

Having described the herbicidal effectiveness of the 3-halo-4-hydroxybenzonitriles, the various forms and means by which these compounds may be efficiently used will now be described.

From a consideration of their chemical structure, it is obvious that the 3-halo-4-hydroxybenzonitriles of this invention are acidic in character and therefore will form certain salts which, because of their increased solubility or other desirable characteristics, will better lend themselves to formulation than do the free phenols. These salts, it is believed, dissociate to the free phenol prior to exertion of herbicidal activity. It is thus contemplated as within the purview of this invention to include such salts, sometimes herein defined as agriculturally acceptable salts, as substantially equivalents of the free phenol (i.e. the halogeno hydroxybenzonitriles). By the term "agriculturally acceptable salts" is meant those salts which are used in agricultural formulations and which do not create any difference in kind of herbicidal activity from that shown by the free phenol. The salts themselves do not change the characteristic application of the free phenol but merely facilitate application or formulating of the compounds as useful herbicides by increasing solubility in vehicles such as oil, water, or oil-water emulsion and the like. The salts may provide for additionally greater elegance in formulation by allowing for greater dispersibility, contact adherence, spreadability, resistance to weathering, and the like.

Typical of the various types of 4-hydroxy modifications suitable for formulation purposes are those formed with ammonia, alkali metals, heavy metals, alkyl and alkanol mines, and certain imidazolines represented by the structural formula:

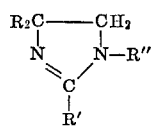

wherein $R'$ is an alkyl radical containing from 1 to 8 carbon atoms, and $R''$ is selected from the group consisting of H, OH and —$CH_2$—$CH_2$—$NH_2$.

Exemplary of the preferred foregoing 4-hydroxy modifications suitable for physical reaction with the 3-halo-4-hydroxybenzonitriles of this invention are such alkali and heavy metals as lithium, sodium, potassium, copper and zinc. It should be noted that almost inumerable alkyl and alkanol amine salts may be synthesized; but however, it is preferred to use those primary, secondary and tertiary alkyl and alkanol amines wherein the hydrocarbyl moiety may be straight or branched-chain radicals having from one to about thirty total carbon atoms, such as for example, methylamine, ethylamine, diethylamine, trimethylamine, trioctylamine, tridecylamine and the commercially available mixtures of primary amines such as those branched-chain amines having a molecular formula of $C_{12}H_{25}NH_2$ to $C_{14}H_{29}NH_2$ and $C_{18}H_{37}NH_2$ to $C_{22}H_{45}NH_2$, as well as the corresponding alkanol amines.

Insofar as the alkyl ethers and alkanoyl esters are concerned it is of course quite possible to form a rather large number and variety of such derivatives which will be suitable for formulation purposes. However, in practice it is generally preferred to prepare lower alkyl ethers and lower alkanoyl esters. With this preference in mind it is to be understood that such other ether and ester derivatives will, in essence, be the full equivalent of the lower alkanoyl esters and lower alkyl ethers and as such are contemplated as being fully embraced herein. The term "lower" of "lower alkanoyl" and "lower alkyl" is used to designate those hydrocarbon chains having from one to ten carbon atoms.

Typical of the preferred compounds, their salts and derivatives, included within the scope of this invention are those which are herein below set forth:

3-chloro-4-hydroxybenzonitrile
3,5-dichloro-4-hydroxybenzonitrile
3-bromo-4-hydroxybenzonitrile
3,5-dibromo-4-hydroxybenzonitrile
3-fluoro-4-hydroxybenzonitrile
3,5-difluoro-4-hydroxybenzonitrile
3-iodo-4-hydroxybenzonitrile
3-iodo-5-t-butyl-4-hydroxybenzonitrile
3,5-diiodo-4-hydroxybenzonitrile
3-bromo-4-hydroxybenzonitrile-acetate
3-bromo-5-t-butyl-4-hydroxybenzonitrile
3,5-diiodo-4-hydroxybenzonitrile-acetate
3-chloro-4-hydroxybenzonitrile-propionate
3-fluoro-4-hydroxybenzonitrile-propionate
3,5-dibromo-4-hydroxybenzonitrile-butyrate
3,5-dichloro-4-hydroxybenzonitrile-butyrate
3-chloro-4-methoxybenzonitrile
3,5-diiodo-4-methoxybenzonitrile
3-iodo-5-t-butyl-4-ethoxybenzonitrile
3-bromo-4-ethoxybenzonitrile
3,5-difluoro-4-ethoxybenzonitrile
3-bromo-4-propoxybenzonitrile
3,5-dibromo-4-isopropoxybenzonitrile
Sodium salt of 3,5-diiodo-4-hydroxybenzonitrile
Lithium salt of 3,5-diiodo-4-hydroxybenzonitrile
Sodium salt of 3-bromo-4-hydroxybenzonitrile
Potassium salt of 3-iodo-4-hydroxybenzonitrile
Ammonium salt of 3-fluoro-4-hydroxybenzonitrile
Trimethylamine salt of 3,5-dibromo-4-hydroxybenzonitrile
Monomethylamine salt of 3-bromo-4-hydroxybenzonitrile
Diethylamine salt of 3-iodo-4-hydroxybenzonitrile
Propylamine salt of 3,5-dichloro-4-hydroxybenzonitrile
Diethanolamine salt of 3,5-diiodo-4-hydroxybenzonitrile Diisopropanolamine salt of 3-chloro-4-hydroxybenzonitrile
t-Butylamine salt of 3,5-diiodo-4-hydroxybenzonitrile
Branched-chain octylamine salt of 3,5-dibromo-4-hydroxybenzonitrile
Branched-chain nonylamine salt of 3-chloro-4-hydroxybenzonitrile
Tri-octylamine salt of 3,5-diiodo-4-hydroxybenzonitrile
Mixed amine salts composed of branched-chain amines having a molecular formula of $C_{12}H_{25}NH_2$ to $C_{14}H_{29}NH_2$ of 3,5-diiodo-4-hydroxybenzonitrile
Mixed amine salts composed of branched-chain amines having a molecular formula of $C_{18}H_{37}NH_2$ to $C_{22}H_{45}NH_2$ of 3,5-diiodo-4-hydroxybenzonitrile
2-ethylimidazoline salt of 3,5-dibromo-4-hydroxybenzonitrile
2-octylimidazoline salt of 3-iodo-4-hydroxybenzonitrile
2-i-propyl-1-(2-aminoethyl)-imidazoline salt of 3,5-diiodo-4-hydroxybenzonitrile
Imidazoline salt of 3-chloro-4-hydroxybenzonitrile
2-ethyl-1-(2-hydroxyethyl)-imidazoline salt of 3-chloro-4-hydroxybenzonitrile The preparation of the novel 3-halo-4-hydroxybenzonitriles may be illustrated by the following exemplification.

Preparation of 3,5-difluoro-4-hydroxybenzonitrile

Step A: Preparation of 4-methyl-2,6-dinitrophenol.—Fifty grams of 4-methylphenol are added to 125 ml. of red fuming nitric acid at 5° C. over a one half hour period. The solution is warmed to 25° C. and agitated for four hours. The reaction mixture is poured into 250 ml. of ice and water. The resulting precipitate is filtered off, washed well with water and dried at 80° C.

Step B: Preparation of 4-methyl-2,6-difluorophenol.—Twenty grams of 4-methyl-2,6-dinitrophenol are dissolved in 400 ml. of warm anhydrous methanol. The solution is cooled to room temperature and nitrogen is passed subsurface for 15 minutes. Under a nitrogen atmosphere, 2 g. of 5% palladium on carbon catalyst is added and the nitrogen replaced by hydrogen. The mixture is hydrogenated in the usual manner at 30 p.s.i.g. until the theoretical amount of hydrogen is consumed. The reaction mixture is cooled and the spent catalyst is removed by filtration under a nitrogen atmosphere. The filtrate is concentrated under vacuum to 150 ml., cooled to −5° C. and used in the next step without delay. A solution of 200 ml. of water and 30 ml. of concentrated hydrochloric acid is added to the concentrated reaction mixture and the resulting slurry is cooled to −5° C. A solution of 14 g. of sodium nitrite dissolved in 50 ml. of water is added with enough external cooling to maintain a temperature of −5 to 0° C. Then 198 ml. of hexafluorophosphoric acid is added in one portion and the reaction mixture is stirred until precipitation is complete. The diazonium fluorophosphate salt is filtered off, washed well with cold water and dried at 70° C. The dry solid is added to 150 ml. of xylene at 125° C. and heating continued until the phosphorous pentafluoride fumes no longer evolve. Extract the product with 5% aqueous sodium bicarbonate. The solution is treated with decolorizing charcoal and the clarified solution poured into ice-water containing hydrochloric acid. The crude 2,6-difluoro-4-methylphenol is used in the next step without further purification.

Step C: Preparation of 3,5-difluoro-4-hydroxybenzaldehyde.—Ten grams of 2,6-difluoro-4-methylphenol are dissolved in 100 ml. of acetic acid and 30 ml. of water. Over a two hour period 7 ml. of bromine is added to the reaction mixture and it is stirred for two additional hours. The resulting slurry is poured into 250 ml. of water, filtered and washed with cold 50% acetic acid. The crude 3,5-difluoro-4-hydroxybenzaldehyde is dried at 50° C.

Step D: Preparation of 3,5-difluoro-4-hydroxybenzonitrile.—Five grams of 3,5-difluoro-4-hydroxybenzaldehyde are added to 25 ml. of acetic anhydride and the slurry heated to reflux. After one hour the excess acetic anhydride is decomposed with water and the solution cooled to room temperature. Hydroxylamine hydrochloride, 5.25 g., and 6.9 g. of sodium acetate are added and the mixture is refluxed for 18 hours. The resulting solution is vacuum concentrated to an oil and it is dissolved in 5% sodium hydroxide and treated with charcoal. The clarified solution is poured into dilute hydrochloric acid and the product is isolated by filtration. The 3,5-difluoro-4-hydroxybenzonitrile is washed well with water and dried at 80° C.

Conversion of the halo-substituted-4-hydroxybenzonitriles into their corresponding alkanoyl derivatives may be accomplished by chemical reaction with the desired carboxylic acid anhydride in pyridine. For example the acetate, propionate and butyrate esters of the halo-substituted-4-hydroxybenzonitriles were prepared using acetic anhydride, propionic anhydride and butyric anhydride, respectively. Conversion of the halo-substituted-4-hydroxybenzonitriles into their corresponding lower alkyl ethers may be accomplished by chemical reaction with the appropriate alkyl sulfate such as dimethyl sulfate according to techniques well known in the art.

Conversion of the halo-substituted-4-hydroxybenzonitriles to their above mentioned salts may be accomplished by admixing the required amounts of the respective agents in a suitable solvent system and warming the resulting mixtures. Preferably a slight excess of the ammonium, alkali metal, alkylamine, alkanolamine, imidazoline or other such reactant is used.

The halo-substituted-4-hydroxybenzonitriles of the present invention, the higher molecular weight amine salts thereof, including imidazoline salts, as well as the lower alkyl ethers and esters thereof, are substantially water insoluble. Accordingly, it has been found desirable to formulate these compounds into useful herbicidal compositions using inert extenders or diluents. These inert ingredients include liquid materials such as organic solvents and agricultural oils, emulsifying, penetration, or dispersing agents, and finely divided solids such as clays, diatomaceous earth, vermiculite, talc, walnut shell flour and calcium carbonate. The amount of active herbicidal constituent in these formulations may range from as little as 0.5% to as much as 95% thereof depending upon the particular type of formulation employed.

So far as the alkali metal, ammonium and lower molecular weight amine salts are concerned, these possess sufficient water solubility so as to be capable of dissolution in aqueous media.

Typical examples of herbicidal formulations falling within the purview of this invention are presented below merely by way of exemplification, and such formulations are not to be construed as in any way limiting the scope of this invention except as defined in the appended claims. In the following examples the "parts" following the constituents of the formulation refers to parts by weight of that substituent.

EXAMPLE I

| | Parts |
|---|---|
| 3,5-diiodo-4-hydroxybenzonitrile | 1 |
| Methylated naphthalene | 2 |
| Polyoxyethylene sorbitol tall oil condensate | 0.5 |

EXAMPLE II

| | Parts |
|---|---|
| 3,5-dibromo-4-hydroxybenzonitrile | 2 |
| Methylated naphthalene | 4 |
| Polyoxyethylene sorbitol tall oil condensate | 1 |

EXAMPLE III

| | Parts |
|---|---|
| 3-bromo-4-hydroxybenzonitrile | 0.5 |
| Methylated naphthalene | 3 |
| Polyoxyethylene sorbitol tall oil condensate | 1 |

Formulations I to III can be diluted with water in all proportions to form stable oil-in-water emulsions suitable for spraying on vegetation.

EXAMPLE IV

| | Parts |
|---|---|
| 3,5-dichloro-4-hydroxybenzonitrile butyrate | 80 |
| Sodium alkylnaphthylene sulfonate | 3 |
| Methyl cellulose | 0.5 |
| Attapulgite clay | 16.5 |

The above components are blended and micro-pulverized, then blended again in order to produce a free-flowing wettable powder which may be dispersed in water for application to vegetation.

EXAMPLE V

| | Parts |
|---|---|
| 3,5-diiodo-4-methoxybenzonitrile | 75 |
| Diatomaceous silica | 20 |
| Polyoxyethylene ester of mixed fatty and resin acids | 5 |

The wettable formulation of Example V may be blended as described under Example IV, and is capable of admixture with water for high or low volume spray application.

EXAMPLE VI

| | Parts |
|---|---|
| 3-chloro-4-hydroxybenzonitrile | 20 |
| Attaclay | 80 |

EXAMPLE VII

| | Parts |
|---|---|
| 3-iodo-5-t-butyl-4-hydroxybenzonitrile | 10 |
| Talc | 90 |

EXAMPLE VIII

| | Parts |
|---|---|
| 3-bromo-4-propoxybenzonitrile | 10 |
| Walnut shell flour | 90 |

EXAMPLE IX

| | Parts |
|---|---|
| 3,5-diiodo-4-hydroxybenzonitrile acetate | 15 |
| Diatomaceous silica | 85 |

EXAMPLE X

| | Parts |
|---|---|
| 3,5-dibromo-4-hydroxybenzonitrile | 20 |
| Talc | 80 |

The dust formulations of Examples VI and X may be applied by conventional dusting apparatus.

EXAMPLE XI

| | Parts |
|---|---|
| 3,5-difluoro-4-hydroxybenzonitrile | 8 |
| Refined kerosene | 1 |
| Dextrine (binding agent) | 20 |
| Goulac (dispersing agent) (sodium salt of lignin sulfonic acid) | 3 |
| Talc | 68 |

EXAMPLE XII

| | Parts |
|---|---|
| 3-bromo-4-isopropoxybenzonitrile | 12 |
| Refined kerosene | 2 |
| Dextrine (binding agent) | 22 |
| Goulac (dispersing agent) (sodium salt of lignin sulfonic acid) | 4 |
| Attaclay | 60 |

The formulations of Examples XI and XII may be prepared simply by mixing the constituents with water to form a paste which is then extruded, dried and ground to any desired granule size. Use of granules having particle sizes between about 0.03 to 0.25 inch in diameter have been found to be particularly adaptable to agricultural equipment and to provide completely satisfactory results.

EXAMPLE XIII

| | Parts |
|---|---|
| 3,5-dichloro-4-hydroxybenzonitrile | 1 |
| Isopropylalcohol | 55 |
| Trichloro-monofluoromethane | 20 |
| Dichloro-difluoromethane | 24 |

EXAMPLE XIV

| | Parts |
|---|---|
| 3,5-diiodo-4-hydroxybenzonitrile | 3 |
| Isopropyl alcohol | 33 |
| Hexylene glycol | 24 |
| Trichloro-monofluoromethane | 20 |
| Dichloro-difluoromethane | 20 |

The formulations of Examples XIII and XIV may be used in aerosol dispensers, the latter formulation providing a more viscous solution thereby imparting a somewhat large spray particle relative to the former formulation.

EXAMPLE XV

| | Parts |
|---|---|
| Mixed branched chain amine having the molecular formula of $C_{12}H_{25}NH_2$ to $C_{14}H_{29}NH_2$ salts of 3,5-diiodo-4-hydroxybenzonitrile | 32 |
| Polyoxyethylene sorbitol tall oil condensate | 20 |
| Methylated naphthalene | 48 |

EXAMPLE XVI

| | Parts |
|---|---|
| Mixed branched-chain amine having the molecular formula of $C_{12}H_{25}NH_2$ to $C_{14}H_{29}NH_2$ salts of 3,5-diiodo-4-hydroxybenzonitrile | 36 |
| Polyoxyethylene sorbitol tall oil condensate | 14 |
| Methylated benzene | 50 |

The formulations of Examples XV and XVI may be used in oil-in-water type emulsions. Other higher molecular weight aliphatic amines may also be used; however, in so doing it is preferred to employ highly branched-chain, high molecular weight primary amines wherein the total carbon atoms range from 7 to about 30.

EXAMPLE XVII

| | Parts |
|---|---|
| 3,5-dibromo-4-hydroxybenzonitrile | 55 |
| 2-s-butylimidazoline | 28 |
| Methylated naphthylene | 10 |
| Xylene | 7 |

EXAMPLE XVIII

| | Parts |
|---|---|
| 3,5-diiodo-4-hydroxybenzonitrile | 37 |
| 2-isopropyl-1-(2-hydroxyethyl)-imidazoline | 17 |
| Benzene | 21 |
| Methylated naphthylene | 25 |

The formulations of Examples XVII and XVIII may be diluted with oil or organic solvents, or may be emulsified in water for spray application.

Combinations of aqueous solutions of alkali metal, ammonium and lower alkyl amines such as those having from 1 to 3 carbon atoms in each alkyl group, with the halo-substituted benzonitriles of this invention result in water soluble reaction products which are readily formulated into aqueous herbicidal concentrates containing up to 3 lbs. of the active ingredient per gallon of the solution.

We claim:
1. The process for controlling plant growth which comprises substantially uniformly distributing in an area wherein the plant is grown, in amount sufficient to exert herbicidal action, a formulated composition including a chemical compound having a molecular structure in which the 4-hydroxybenzonitrile nucleus has attached thereto in the 3-position a halogen atom.
2. The process according to claim 1, wherein the 3-position halogen atom is iodine.

3. The process according to claim 1, wherein the 3-position halogen atom is iodine, and there is also attached in the 5-position an iodine atom.

4. The process according to claim 1, wherein the 3-position halogen atom is bromine.

5. The process according to claim 1, wherein the 3-position halogen atom is bromine, and there is also attached in the 5-position an iodine atom.

6. The process according to claim 1, wherein the 3-position halogen atom is iodine, and there is also attached in the 5-position a t-butyl radical.

7. The process according to claim 1, wherein the 3-position halogen atom is chlorine.

8. The process according to claim 1, wherein the 3-position halogen atom is chlorine, and there is also attached in the 5-position a chlorine atom.

9. The process according to claim 1, wherein the 3-position halogen atom is bromine, and there is also attached in the 5-position a bromine atom.

10. A method of controlling the growth of weeds at a locus which comprises aplying to the locus a herbicidally effective amount of a compound selected from the group consisting of 3,5-diiodo-4-hydroxybenzonitrile and 3,5-dibromo-4-hydroxybenzonitrile.

References Cited

UNITED STATES PATENTS

| | | | |
|---|---|---|---|
| 2,978,310 | 4/1961 | Daams et al. | 71—2.3 |
| 3,259,646 | 7/1966 | Harris et al. | 71—2.6 X |

FOREIGN PATENTS 902,586  8/1962  Great Britain.

OTHER REFERENCES

Nature, vol. 200, No. 4901, Oct. 5, 1963, pp. 28 and 29.

JAMES O. THOMAS, JR., *Primary Examiner.*